United States Patent
Yao et al.

(10) Patent No.: US 12,301,751 B2
(45) Date of Patent: May 13, 2025

(54) PREDEFINED POLICY AND CHARGING CONTROL RULES MANAGEMENT

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 17/918,441

(22) PCT Filed: Jun. 3, 2021

(86) PCT No.: PCT/US2021/035763
§ 371 (c)(1),
(2) Date: Oct. 12, 2022

(87) PCT Pub. No.: WO2022/026056
PCT Pub. Date: Feb. 3, 2022

(65) Prior Publication Data
US 2023/0133781 A1  May 4, 2023

Related U.S. Application Data

(60) Provisional application No. 63/059,628, filed on Jul. 31, 2020.

(51) Int. Cl.
*H04M 15/00*  (2024.01)
(52) U.S. Cl.
CPC ....... *H04M 15/66* (2013.01); *H04M 15/8016* (2013.01)

(58) Field of Classification Search
CPC .. H04M 15/66; H04M 15/8016; H04M 15/61; H04L 12/12; H04L 12/1407; H04W 28/02; H04W 4/24
See application file for complete search history.

(56) References Cited

U.S. PATENT DOCUMENTS

| | | | |
|---|---|---|---|
| 11,304,085 B2* | 4/2022 | Ding | ................ H04W 28/0268 |
| 2019/0222489 A1 | 7/2019 | Shan | |
| 2020/0068446 A1 | 2/2020 | Nimbavikar et al. | |
| 2020/0213909 A1* | 7/2020 | Oh | ...................... H04L 12/1407 |

FOREIGN PATENT DOCUMENTS

| | | |
|---|---|---|
| CN | 110972092 A | 4/2020 |
| WO | WO-2019223674 A1 | 11/2019 |
| WO | WO-2022026056 A1 | 2/2022 |

OTHER PUBLICATIONS

"European Application Serial No. 23211536.0, Extended European Search Report mailed Feb. 15, 2024", 12 pgs.

(Continued)

*Primary Examiner* — Christopher M Brandt
(74) *Attorney, Agent, or Firm* — Schwegman Lundberg & Woessner, P.A.

(57) ABSTRACT

A method and system for managing predefined PCC rules and 5QIs in a 5G network are described. The predefined PCC rules and 5QIs are assigned to a PCF and/or SMF and managed by a MOI of an IOC modelling the PCC rule and 5QIs. Attributes of the MOIs are specific to the PCC rule and 5QIs being managed.

20 Claims, 11 Drawing Sheets

(56) References Cited

OTHER PUBLICATIONS

Intel, "Add IOC for configurable 5QIs", 3GPP Draft; SP-200605, 3rd Generation Partnership Project (3GPP), Mobile Competence Centre ; 650, Route Des Lucioles ; F-06921 Sophia-Antipolis Cedex; France, vol. TSG SA, no. Electronic meeting; Jun. 30, 2020-Jul. 3, 2020, [Online]. Retrieved from the Internet:URL: https:ftp.3gpp.org tsg_sa TSG_SA TSGS_88E_Electronic Docs SP-200605.zipSP-200605_S5-203414rl Rel-16 CR28.541.docx, (Jun. 30, 2020).

"International Application Serial No. PCT/US2021/035763, International Search Report mailed Sep. 10, 2021", 3 pgs.

"International Application Serial No. PCT/US2021/035763, Written Opinion mailed Sep. 10, 2021", 4 pgs.

"European Application Serial No. 21848717.1, Extended European Search Report mailed Jul. 3, 2024", 17 pgs.

"3rd Generation Partnership Project; Technical Specification Group Services and System Aspects; System architecture for the 5G System (5GS); Stage 2 (Release 16)", 3gpp Standard; Technical Specification; 3gpp Ts 23.501, 3rd Generation Partnership Project (3GPP), Mobile Competence Centre ; 650, Route Des Lucioles ; F-06921 Sophia-Antipolis Cedex ; France vol. SA WG2, No. V16.5.0, [Online]. Retrieved from the Internet: URL : ftp : ftp.3gpp.org Specs archive 23_series 23.501 23501-g50.zip 23501-g50.docx, (Jul. 9, 2020), 89 pgs.

"3rd Generation Partnership Project; Technical Specification Group Services and System Aspects; Management and orchestration; Generic management services; (Release 16)", 3GPP Standard; Technical Specification; 3GPP TS 28.532, 3rd Generation Partnership Project (3GPP), Mobile Competence Centre ; 650, Route Des Lucioles ; F-06921 Sophia-Antipolis Cedex ; France vol. SA WG5, No. V16.4.0, [Online]. Retrieved from the Internet: URL : ftp : ftp.3gpp.org Specs archive 28_series 28.532 28532-g40.zip 28532-g40.doc, (Jul. 10, 2020), 1-245.

"European Application Serial No. 23211536.0, Response filed Aug. 30, 2024 to Extended European Search Report mailed Feb. 15, 2024", 27 pgs.

"European Application Serial No. 21848717.1, Response filed Dec. 19, 2024 to Extended European Search Report mailed Jul. 3, 2024", 15 pgs.

\* cited by examiner

PREDEFINED POLICY AND CHARGING CONTROL RULES MANAGEMENT

PRIORITY CLAIM

This application is a U.S. National Stage Filing under 35 U.S.C. 371 from International Application No. PCT/US2021/035763, filed Jun. 3, 2021 and published in English as WO 2022/026056 on Feb. 3, 2022, which claims the benefit of priority to U.S. Provisional Patent Application Ser. No. 63/059,628, filed Jul. 31, 2020, each of which is incorporated herein by reference in its entirety.

TECHNICAL FIELD

Embodiments pertain to wireless communications in 5G, or new radio (NR), systems. Some embodiments related to PCC rule management in 5G networks.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/5$^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 1A illustrates an architecture of a network, in accordance with some aspects.

FIG. 1B illustrates a non-roaming 5G system architecture in accordance with some aspects.

FIG. 1C illustrates a non-roaming 5G system architecture in accordance with some aspects.

FIG. 2 illustrates a block diagram of a communication device in accordance with some embodiments.

FIG. 3 illustrates a Network Resource Model (NRM) fragment for a predefined PCC rule in accordance with some embodiments.

FIG. 4 illustrates an inheritance hierarchy for a predefined PCC rule modeling in accordance with some embodiments.

FIG. 5 illustrates a NRM fragment for configurable 5G Quality of Service (QoS) Identifiers (5Qis) in a 5G core network (5GC) in accordance with some embodiments.

FIG. 6 illustrates a NRM fragment for dynamic 5QIs in a NG radio access network (NG-RAN) in accordance with some embodiments.

FIG. 7 illustrates a NRM fragment for dynamic 5Qis in the 5GC in accordance with some embodiments.

FIG. 8 illustrates an inheritance hierarchy for IOC Dynamic5QISet in accordance with some embodiments.

FIG. 9 illustrates a method of providing PCC rule information in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 11 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

There are two types of PCC rules in 5G systems, dynamic rules and predefined rules. The predefined PCC rules are configured into the SMF, and referenced by the PCF, and PCF may activate/deactivate the predefined PCC rules in SMF (see TS 23.501, v.16.5.0). The PCC rule may be predefined or dynamically provisioned at establishment and during the lifetime of a PDU Session. The latter is referred to as a dynamic PCC rule. Provisioning and managing the predefined PCC rules is disclosed herein. Note that the management service producer may be co-located with one of the network entities (e.g., PCF, SMF) or may be separate device from the network entities.

The PCF may provide QoS control policy data to the SMF based on the pre-configured 5QIs, therefore the PCF should support the configurable 5QIs, (see TS 23.501 and TS 29.512, v. 16.5.0, 2020-07-10). However, the configurable 5QIs are not supported by PCF in the current NRM (in TS 28.541, v. 16.5.0).

The 5QIs could be also dynamically assigned by the network (see 23.501). The dynamic 5QI value and characteristics are assigned by the PCF or SMF (e.g., if the PCF is not deployed), and signaled to other relevant NFs as part of the QoS profile. The dynamic 5QIs should be known by the Operations, Administration and Maintenance (OAM), as the OAM should monitor the network performance related to each 5QI.

Among other things, embodiments of the present disclosure provide for predefined PCC rule management, for enabling the PCF to support configurable 5Qis, and for monitoring the dynamic 5QIs.

1. To define the following IOC and dataTypes in TS 28.541 for predefined PCC rule management.

5.3.a PredefinedPccRuleSet 5.3.a.1 Definition

This IOC specifies the predefined PCC rules, which are configured to SMF and referenced by PCF, see 3GPP TS 23.503, v. 16.5.0.

5.3.a.2 Attributes

| Attribute name | Support Qualifier | isReadable | isWritable | isInvariant | isNotifyable |
|---|---|---|---|---|---|
| predefinedPccRules | M | T | T | F | T |

5.3.a.3 Attribute constraints
None.
5.3.a.4 Notifications
The common notifications defined in subclause 5.5 are valid for this IOC, without exceptions or additions.
5.3.b PccRule<<dataType>>
5.3.b.1 Definition
This data type specifies the PCC rule, see TS 29.512.
5.3.b.2 Attributes

| Attribute name | Support Qualifier | isReadable | isWritable | isInvariant | isNotifyable |
|---|---|---|---|---|---|
| pccRuleId | M | T | T | F | T |
| flowInfoList | CM | T | T | F | T |
| applicationId | CM | T | T | F | T |
| contentVersion | O | T | T | F | T |
| precedence | CM | T | T | F | T |
| afSigProtocol | O | T | T | F | T |
| isAppRelocatable | O | T | T | F | T |
| isUeAddrPreserved | O | T | T | F | T |
| qosData | M | T | T | F | T |
| trafficControlData | M | T | T | F | T |
| conditionData | O | T | T | F | T |

5.3.b.3 Attribute constraints

| Name | Definition |
|---|---|
| flowInfoList Support Qualifier | Condition: The applicationId is not supported. |
| applicationId Support Qualifier | Condition: The flowInfoList is not supported. |
| precedence Support Qualifier | Condition: The flowInfoList is provided. |

5.3.b.4 Notifications

The subclause 4.5 of the <<IOC>> using this <<dataType>> as one of its attributes, shall be applicable.

5.3.c FlowInformation dataType
5.3.c.1 Definition

This data type specifies the flow information of a PCC rule.

5.3.c.2 Attributes

| Attribute name | Support Qualifier | isReadable | isWritable | isInvariant | isNotifyable |
|---|---|---|---|---|---|
| flowDescription | M | T | T | F | T |
| ethFlowDescription | M | T | T | F | T |
| packFilterId | M | T | T | F | T |
| packetFilterUsage | M | T | T | F | T |
| tosTrafficClass | M | T | T | F | T |
| Spi | M | T | T | F | T |
| flowLabel | O | T | T | F | T |
| flowDirection | M | T | T | F | T |

5.3.c.3 Attribute constraints
None
5.3.c.4 Notifications
The subclause 4.5 of the <<IOC>> using this <<dataType>> as one of its attributes, shall be applicable.
5.3.d EthFlowDescription dataType
5.3.d.1 Definition
This data type describes an Ethernet flow.
5.3.d.2 Attributes

| Attribute name | Support Qualifier | isReadable | isWritable | isInvariant | isNotifyable |
|---|---|---|---|---|---|
| destMacAddr | M | T | T | F | T |
| ethType | M | T | T | F | T |
| fDesc | CM | T | T | F | T |
| fDir | M | T | T | F | T |
| sourceMacAddr | M | T | T | F | T |
| vlanTags | M | T | T | F | T |
| srcMacAddrEnd | O | T | T | F | T |
| destMacAddrEnd | O | T | T | F | T |

5.3.d.3 Attribute constraints

| Name | Definition |
| --- | --- |
| fDesc Suppers Qualifier | Condition: The ethType is IP. |

5.3.d.4 Notifications
The subclause 4.5 of the <<IOC>> using this <<dataType>> as one of its attributes, shall be applicable.

5.3.e QoSData <<dataType>>

5.3.e.1 Definition
This data type specifies the QoS control policy data for a service flow of a PCC rule.

5.3.e.2 Attributes

| Attribute name | Support Qualifier | isReadable | isWritable | isInvariant | isNotifyable |
| --- | --- | --- | --- | --- | --- |
| qosId | M | T | T | F | T |
| fiveQICharacteristics | M | T | T | F | T |
| maxbrUl | O | T | T | F | T |
| maxbrDl | O | T | T | F | T |
| gbrUl | O | T | T | F | T |
| gbrDl | O | T | T | F | T |
| Arp | M | T | T | F | T |
| qosNotificationControl | O | T | T | F | T |
| reflectiveQos | O | T | T | F | T |
| sharingKeyDl | O | T | T | F | T |
| sharingKeyUl | O | T | T | F | T |
| maxPacketLossRateDl | O | T | T | F | T |
| maxPacketLossRateUl | O | T | T | F | T |

5.3.e.3 Attribute constraints
None.

5.3.e.4 Notifications
The subclause 4.5 of the <<IOC>> using this <<dataType>> as one of its attributes, shall be applicable.

5.3.e ARP dataType 5.3.e.1 Definition
This data type specifies the allocation and retention priority of a QoS control policy.

5.3.e.2 Attributes

| Attribute name | Support Qualifier | isReadable | isWritable | isInvariant | isNotifyable |
| --- | --- | --- | --- | --- | --- |
| priorityLevel | M | T | T | F | T |
| preemptCap | M | T | T | F | T |
| preemptVuln | M | T | T | F | T |

5.3.e.3 Attribute constraints
None 5.3.e.4 Notifications
The subclause 4.5 of the <<IOC>> using this <<dataType>> as one of its attributes, shall be applicable.

5.3.f TrafficControlData dataType 5.3.f.1 Definition
This data type specifies the traffic control data for a service flow of a PCC rule.

5.3.f.2 Attributes

| Attribute name | Support Qualifier | isReadable | isWritable | isInvariant | isNotifyable |
| --- | --- | --- | --- | --- | --- |
| tcId | M | T | T | F | T |
| flowStatus | M | T | T | F | T |
| redirectInfo | O | T | T | F | T |
| muteNotif | O | T | T | F | T |
| trafficSteeringPolIdDl | O | T | T | F | T |
| trafficSteeringPolIdUl | O | T | T | F | T |
| routeToLocs | M | T | T | F | T |
| upPathChgEvent | O | T | T | F | T |
| steerFun | O | T | T | F | T |
| steerModeDl | O | T | T | F | T |
| steerModeUl | O | T | T | F | T |

5.3.f.3 Attribute constraints
None
5.3.f.4 Notifications
The subclause 4.5 of the IOC>> using this <<dataType>> as one of its attributes, shall be applicable.
5.3.g RedirectInformation dataType
5.3.g.1 Definition
This data type specifies the redirect information for traffic control in the PCC rule.
5.3.g.2 Attributes

| Attribute name | Support Qualifier | isReadable | isWritable | isInvariant | isNotifyable |
|---|---|---|---|---|---|
| redirectEnabled | M | T | T | F | T |
| redirectAddressType | M | T | T | F | T |
| redirectServerAddress | M | T | T | F | T |

3.g.3 Attribute constraints
None
5.3.g.4 Notifications
The subclause 4.5 of the IOC>> using this <<dataType>> as one of its attributes, shall be applicable.
5.3.h RouteToLocation dataType
5.3.h.1 Definition
This data type specifies a list of location which the traffic shall be routed to for the AF request.
5.3.h.2 Attributes

| Attribute name | Support Qualifier | isReadable | isWritable | isInvariant | isNotifyable |
|---|---|---|---|---|---|
| Dnai | M | T | T | F | T |
| routeInfo | CM | T | T | F | T |
| routeProfId | CM | T | T | F | T |

5.3.h.3 Attribute constraints

| Name | Definition |
|---|---|
| routeInfo Support Qualifier | Condition: The routeProfId is not supported. |
| routeProfId Support Qualifier | Condition: The routeInfo is not supported. |

5.3.h.4 Notifications
The subclause 4.5 of the <<IOC>> using this <<dataType>> as one of its attributes, shall be applicable.
5.3.i RouteInformation dataType
5.3.i.1 Definition
This data type specifies the traffic routing information.
5.3.i.2 Attributes

| Attribute name | Support Qualifier | isReadable | isWritable | isInvariant | isNotifyable |
|---|---|---|---|---|---|
| ipv4Addr | CM | T | T | F | T |
| ipv6Addr | CM | T | T | F | T |
| portNumber | M | T | T | F | T |

5.3.i.3 Attribute constraints

| Name | Definition |
|---|---|
| ipv4Addr Support Qualifier | Condition: The ipv6Addr is not supported. |
| ipv6Addr Support Qualifier | Condition: The ipv4Addr is not supported. |

5.3.i.4 Notifications
The subclause 4.5 of the <<IOC>> using this <<dataType>> as one of its attributes, shall be applicable.

5.3.j UpPathChgEvent dataType 5.3.j.1 Definition
This data type specifies the information about the AF subscriptions of the UP path change, see TS 29.512.

5.3.j.2 Attributes

| Attribute name | Support Qualifier | isReadable | isWritable | isInvariant | isNotifyable |
|---|---|---|---|---|---|
| notificationUri | M | T | T | F | T |
| notifCorreId | M | T | T | F | T |
| dnaiChgType | M | T | T | F | T |
| afAckInd | O | T | T | F | T |

5.3.j.3 Attribute constraints
None 5.3.j.4 Notifications
The subclause 4.5 of the IOC>> using this <<dataType>> as one of its attributes, shall be applicable.

5.3.k SteeringMode dataType 5.3.k.1 Definition
This data type specifies the traffic distribution rule, see TS 29.512.

5.3.k.2 Attributes

| Attribute name | Support Qualifier | isReadable | isWritable | isInvariant | isNotifyable |
|---|---|---|---|---|---|
| steerModeValue | M | T | T | F | T |
| active | CM | T | T | F | T |
| standby | O | T | T | F | T |
| 3gLoad | CM | T | T | F | T |
| prioAcc | CM | T | T | F | T |

5.3.k.3 Attribute constraints

| Name | Definition |
|---|---|
| active Support Qualifier | Condition: The steerModeValue supports "ACTIVE_STANDBY". |
| threeGLoad Support Qualifier | Condition: The steerModeValue supports "LOAD_BALANCING". |
| prioAcc Support Qualifier | Condition: The steerModeValue supports "PRIORITY_BASED". |

5.3.k.4 Notifications
The subclause 4.5 of the IOC>> using this <<dataType>> as one of its attributes, shall be applicable.

5.3.l ConditionData dataType 5.3.l.1 Definition
This data type specifies the condition data for a PCC rule.

5.3.l.2 Attributes

| Attribute name | Support Qualifier | isReadable | isWritable | isInvariant | isNotifyable |
|---|---|---|---|---|---|
| condId | M | T | T | F | T |
| activationTime | O | T | T | F | T |
| deactivationTime | O | T | T | F | T |
| accessType | O | T | T | F | T |
| ratType | O | T | T | F | T |

5.3.1.3 Attribute constraints
None

5.3.1.4 Notifications
The subclause 4.5 of the <<IOC>> using this <<dataType>> as one of its attributes, shall be applicable.

Figure 1A:
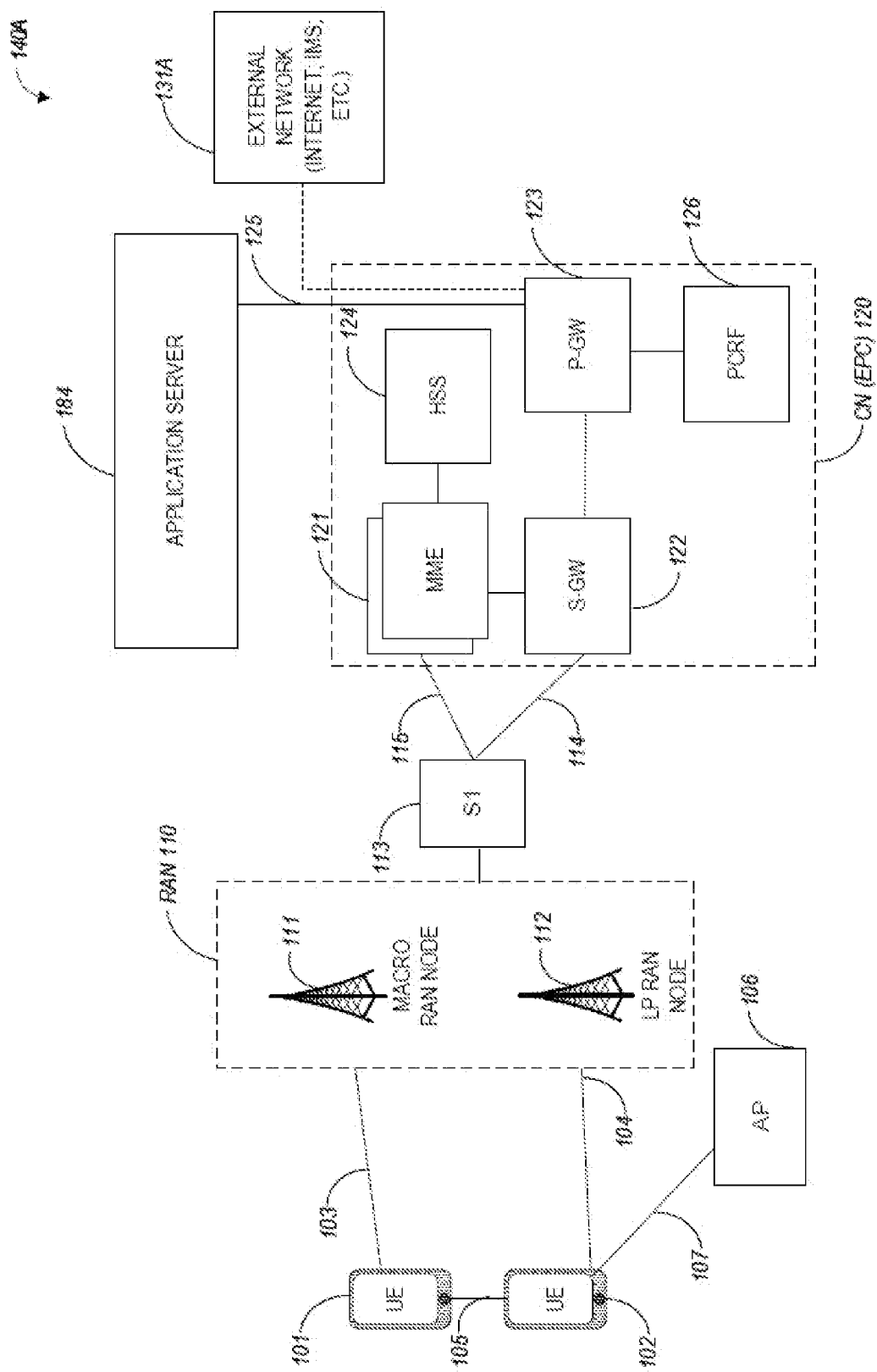
Figure 1B:
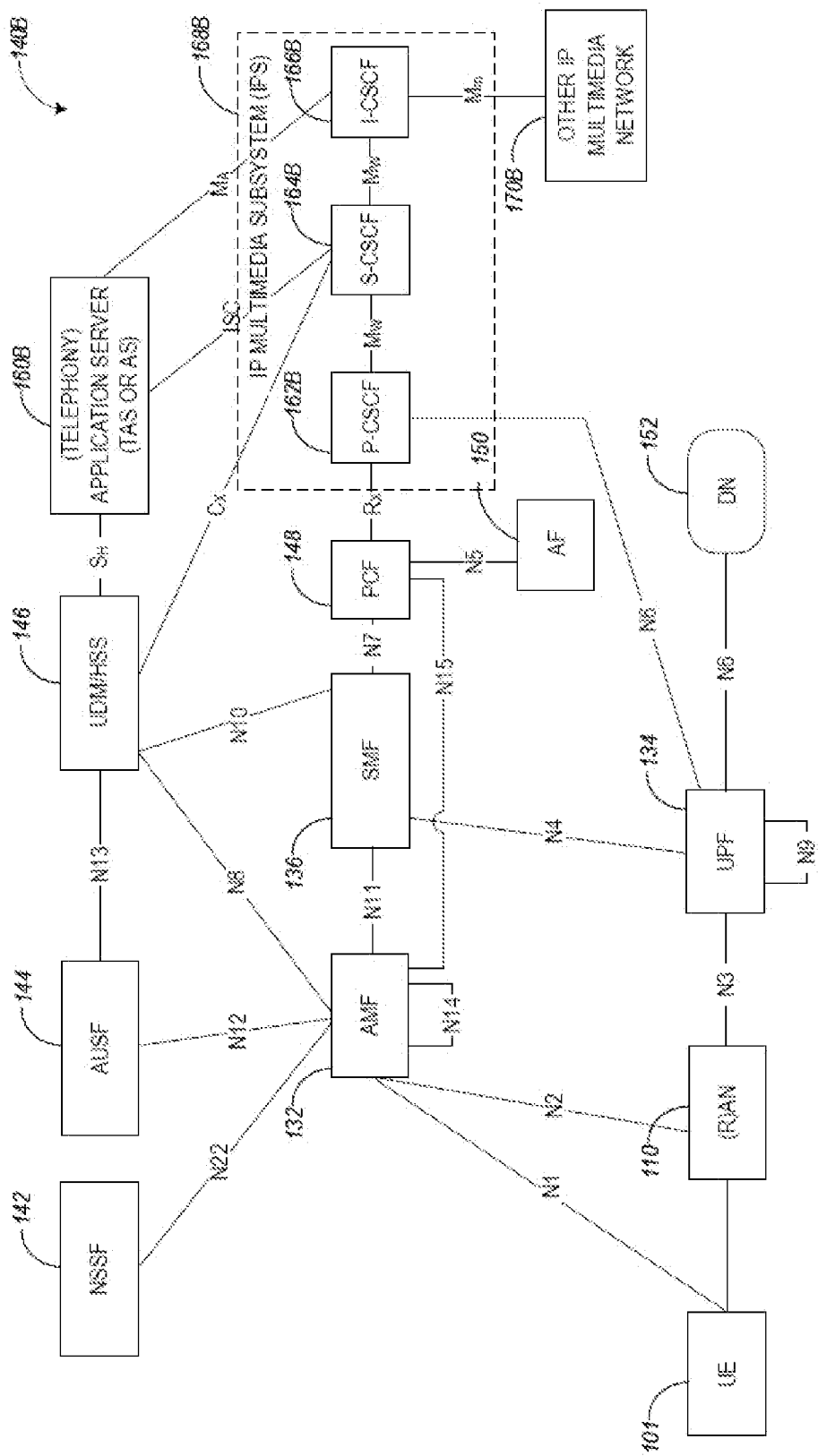
Figure 1C:
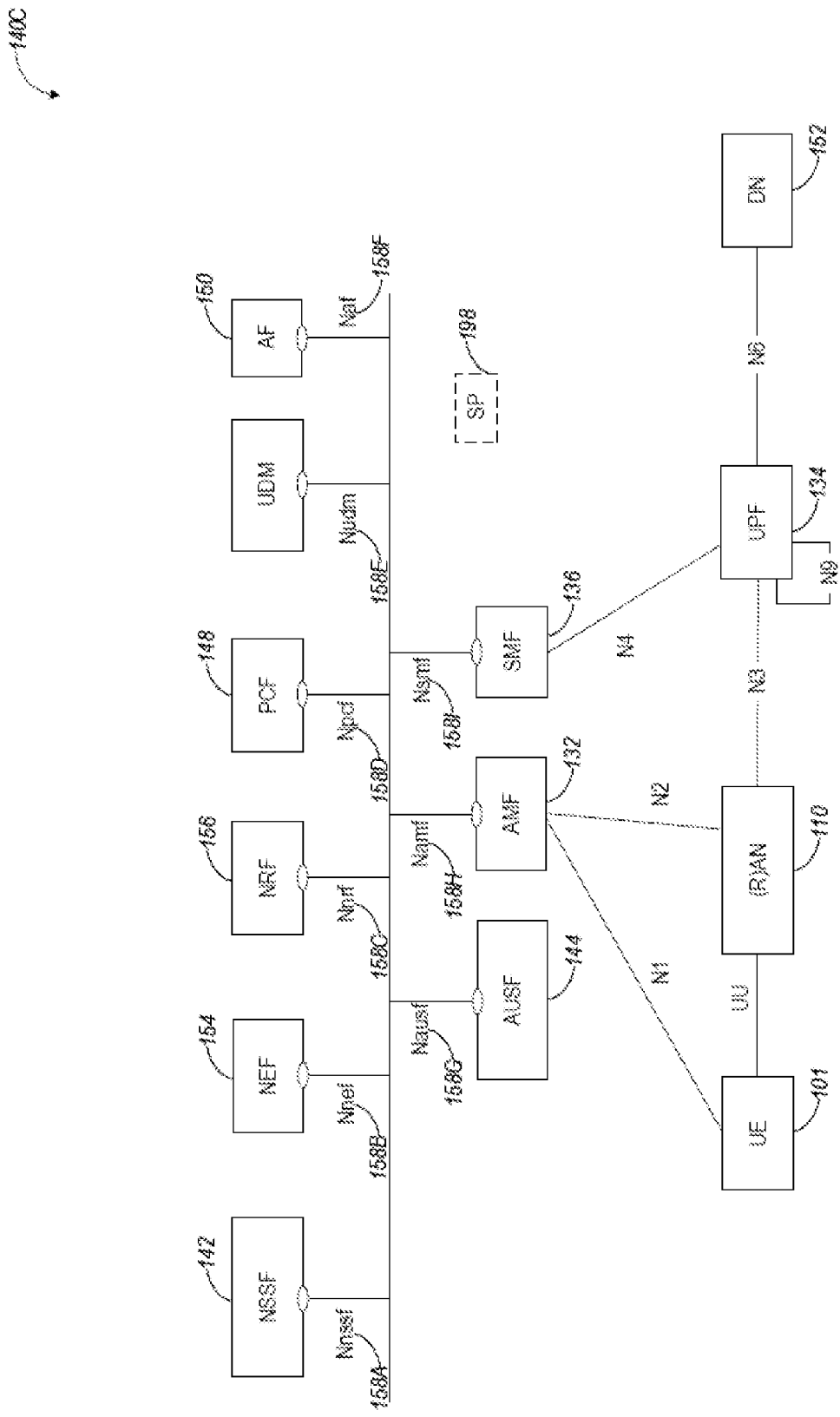
Figure 2:
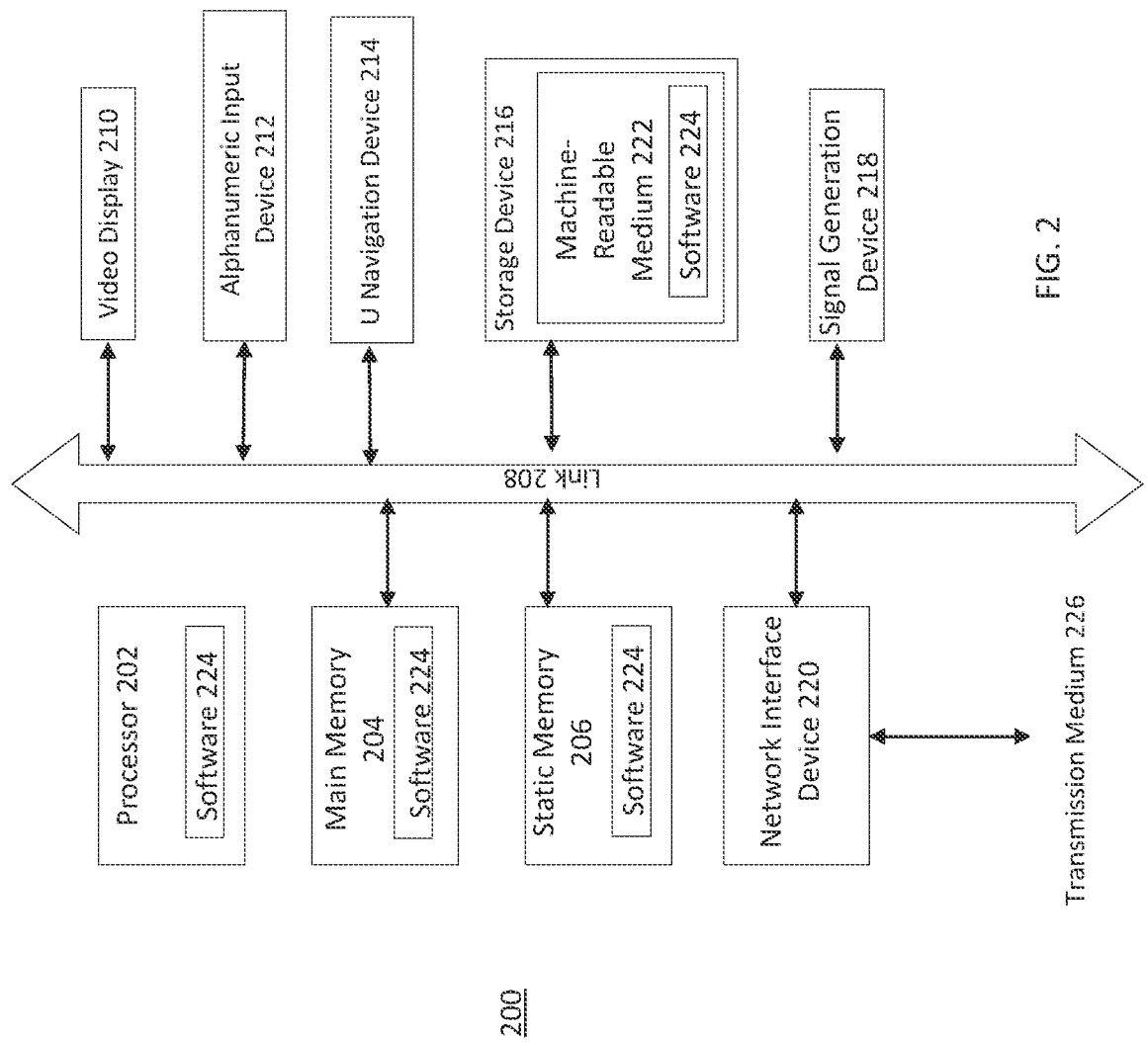
Figure 3:
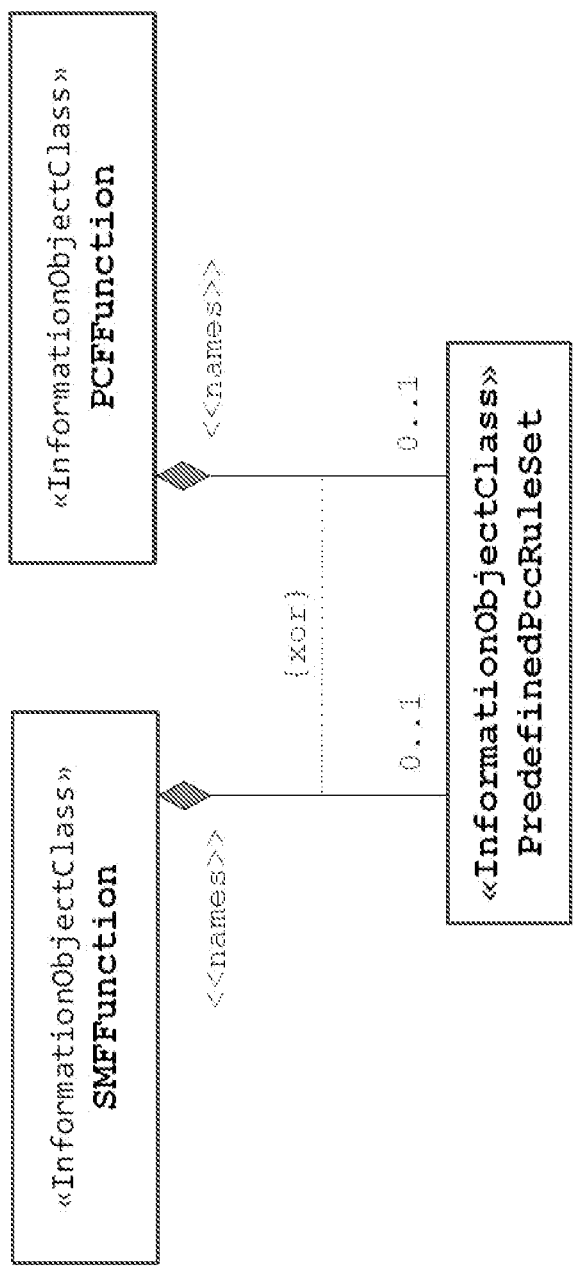
FIG. 3 illustrates a NRM fragment for a predefined PCC rule in accordance with some embodiments.
Figure 4:
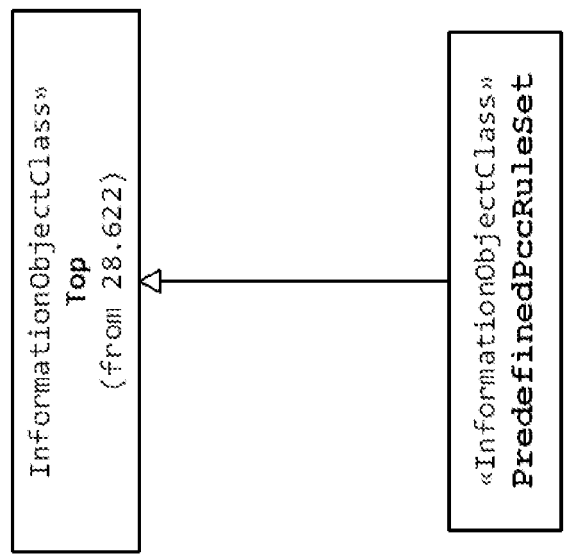
FIG. 4 illustrates an inheritance hierarchy for a predefined PCC rule modeling in accordance with some embodiments.

5.4.1 Attribute properties
The following table defines the attributes that are present in several Information Object Classes (IOCs) and data types of the present document.

| Attribute Name | Documentation and Allowed Values | Properties |
| --- | --- | --- |
| predefinedPccRules | It specifies the predefined PCC Rules, see TS 25.503.<br>allowedValues: N/A | type: PccRule<br>multiplicity: 1 . . . *<br>isOrdered: N/A<br>isUnique: N/A<br>defaultValue: None<br>isNullable: False |
| pccRuleId | It identifies the PCC rule.<br>allowedValues: N/A | type: String<br>multiplicity: 1<br>isOrdered: N/A<br>isUnique: N/A<br>defaultValue: None<br>isNullable: False |
| flowInfoList | It is a list of IP flow packet filter information.<br>allowedValues: N/A | type: FlowInformation<br>multiplicity: *<br>isOrdered: N/A<br>isUnique: N/A<br>defaultValue: None<br>isNullable: False |
| applicationId | A reference to the application detection filter configured at the UPF.<br>allowedValues: N/A | type: String<br>multiplicity: 1<br>isOrdered: N/A<br>isUnique: N/A<br>defaultValue: None<br>isNullable: False |
| contentVersion | Indicates the content version of the PCC rule.<br>allowedValues: N/A | type: Integer<br>multiplicity: 1<br>isOrdered: N/A<br>isUnique: N/A<br>defaultValue: None<br>isNullable: False |
| precedence | It indicates the order in which this PCC rule is applied relative to other PCC rules within the same PDU session.<br>allowedValues: 0 . . . 255. | type: Integer<br>multiplicity: 1<br>isOrdered: N/A<br>isUnique: N/A<br>defaultValue: None<br>isNullable: False |
| afSigProtocol | Indicates the protocol used for signalling between the UE and the AF. The default value is "NO_INFORMATION".<br>allowedValues: "NO_INFORMATION", "SIP". | type: ENUM<br>multiplicity: 1<br>isOrdered: N/A<br>isUnique: N/A<br>defaultValue: "NO_INFORMATION"<br>isNullable: False |
| isAppRelocatable | It indicates the application relocation possibility. The default value is "NO_INFORMATION.<br>allowedValues: "TRUE", "FALSE". | type: Boolean<br>multiplicity: 1<br>isOrdered: N/A<br>isUnique: N/A<br>defaultValue: None<br>isNullable: False |
| isUeAddrPreserved | It Indicates whether UE IP address should be preserved.<br>The default value is "FALSE".<br>allowedValues: "TRUE", "FALSE". | type: Boolean<br>multiplicity: 1<br>isOrdered: N/A<br>isUnique: N/A<br>defaultValue: "FALSE"<br>isNullable: False |
| qosData | It contains the QoS control policy data for a PCC rule.<br>allowedValues: N/A | type: QoSData<br>multiplicity: 1<br>isOrdered: N/A<br>isUnique: N/A<br>defaultValue: None<br>isNullable: False |

-continued

| Attribute Name | Documentation and Allowed Values | Properties |
|---|---|---|
| trafficControlData | It contains the traffic control policy data for a PCC rule.<br>allowedValues: N/A | type: TrafficControlData<br>multiplicity: 1<br>isOrdered: N/A<br>isUnique: N/A<br>defaultValue: None<br>isNullable: False |
| conditionData | It contains the condition data for a PCC rule.<br>allowedValues: N/A | type: ConditionData<br>multiplicity: 1<br>isOrdered: N/A<br>isUnique: N/A<br>defaultValue: None<br>isNullable: False |
| flowDescription | It defines a packet filter for an IP flow.<br>allowedValues: see TS 29.214. | type: String<br>multiplicity: 1<br>isOrdered: N/A<br>isUnique: N/A<br>defaultValue: None<br>isNullable: False |
| ethFlowDescription | It defines a packet filter for an Ethernet flow.<br>allowedValues: see TS 29.514. | type: EthFlowDescription<br>multiplicity: 1<br>isOrdered: N/A<br>isUnique: N/A<br>defaultValue: None<br>isNullable: False |
| destMacAddr | It specifies the destination MAC address formatted in the hexadecimal notation according to clause 1.1 and clause 2.1 of IETF RFC 7042.<br>Pattern: '^([0-9a-fA-F]{2})((-[0-9a-fA-F]{2}){5})$'.<br>allowedValues: N/A. | type: String<br>multiplicity: 1<br>isOrdered: N/A<br>isUnique: N/A<br>defaultValue: None<br>isNullable: False |
| ethType | A two-octet string that represents the Ethertype, as described in IEEE 802.3 and IETF RFC 7042 in hexadecimal representation.<br>Each character in the string shall take a value of "0" to "9" or "A" to "F" and shall represent 4 bits. The most significant character representing the 4 most significant bits of the ethType shall appear first in the string, and the character representing the 4 least significant bits of the ethType shall appear last in the string.<br>allowedValues: see IEEE 802.3 and IETF RFC 7042. | type: String<br>multiplicity: 1<br>isOrdered: N/A<br>isUnique: N/A<br>defaultValue: None<br>isNullable: False |
| fDesc | It contains the flow description for the Uplink or Downlink IP flow. It shall be present when the ethtype is IP.<br>allowedValues: see flowDescription in TS 29.214. | type: String<br>multiplicity: 1<br>isOrdered: N/A<br>isUnique: N/A<br>defaultValue: None<br>isNullable: False |
| fDir | It indicates the packet filter direction.<br>allowedValues: "DOWNLINK", "UPLINK". | type: ENUM<br>multiplicity: 1<br>isOrdered: N/A<br>isUnique: N/A<br>defaultValue: None<br>isNullable: False |
| sourceMacAddr | It specifies the source MAC address formatted in the hexadecimal notation according to clause 1.1 and clause 2.1 of IETF RFC 7042.<br>Pattern: '^([0-9a-fA-F]{2})((-[0-9a-fA-F]{2}){5})$'.<br>allowedValues: N/A. | type: String<br>multiplicity: 1<br>isOrdered: N/A<br>isUnique: N/A<br>defaultValue: None<br>isNullable: False |
| vlanTags | It specifies the Customer-VLAN and/or Service-VLAN tags containing the VID, PCP/DEI fields as defined in IEEE 802.1Q and IETF RFC 7042. The first/lower instance in the array stands for the Customer-VLAN tag and the second/higher instance in the array stands for the Service-VLAN tag.<br>Each field is encoded as a two-octet string in hexadecimal representation. Each character in the string shall take a value of "0" to "9" or "A" to "F" and shall represent 4 bits. The most significant character representing the PCP/DEI field shall appear first in the string, followed by | type: String<br>multiplicity: *<br>isOrdered: N/A<br>isUnique: N/A<br>defaultValue: None<br>isNullable: False |

| Attribute Name | Documentation and Allowed Values | Properties |
| --- | --- | --- |
| | character representing the 4 most significant bits of the VID field, and the character representing the 4 least significant bits of the VID field shall appear last in the string. If only Service-VLAN tag is provided, empty string for Customer-VLAN tag shall be provided. allowedValues: see IEEE 802.1Q and IETF RFC 7042. | |
| srcMacAddrEnd | It specifies the source MAC address end. If this attribute is present, the sourceMacAddr attribute specifies the source MAC address start. E.g. srcMacAddrEnd with value 00-10-A4-23-3E-FE and sourceMacAddr with value 00-10-A4-23-3E-02 means all MAC addresses from 00-10-A4-23-3E-02 up to and including 00-10-A4-23-3E-FE. allowedValues: N/A. | type: String multiplicity: 1 isOrdered: N/A isUnique: N/A defaultValue: None isNullable: True |
| destMacAddrEnd | It specifies the destination MAC address end. If this attribute is present, the destMacAddr attribute specifies the destination MAC address start. allowedValues: N/A. | type: String multiplicity: 1 isOrdered: N/A isUnique: N/A defaultValue: None isNullable: True |
| packFilterId | It is the identifier of the packet filter. allowedValues: N/A. | type: String multiplicity: 1 isOrdered: N/A isUnique: N/A defaultValue: None isNullable: False |
| packetFilterUsage | It indicates if the packet shall be sent to the UE. The default value is "FALSE". allowedValues: TRUE, FALSE | type: Boolean multiplicity: 1 isOrdered: N/A isUnique: N/A defaultValue: "FALSE" isNullable: False |
| tosTrafficClass | It contains the Ipv4 Type-of-Service and mask field or the Ipv6 Traffic-Class field and mask field. allowedValues: N/A | type: String multiplicity: 1 isOrdered: N/A isUnique: N/A defaultValue: None isNullable: False |
| spi | It is the security parameter index of the IPSec packet, see IETF RFC 4301. allowedValues: see IETF RFC 4301. | type: String multiplicity: 1 isOrdered: N/A isUnique: N/A defaultValue: None isNullable: True |
| flowLabel | It specifies the Ipv6 flow label header field. AllowedValues: N/A | type: String multiplicity: 1 isOrdered: N/A isUnique: N/A defaultValue: None isNullable: True |
| flowDirection | It indicates the direction/directions that a filter is applicable. AllowedValues: "DOWNLINK", "UPLINK", "BIDIRECTIONAL", "UNSPECIFIED". | type: ENUM multiplicity: 1 isOrdered: N/A isUnique: N/A defaultValue: None isNullable: True |
| qosId | It identifies the QoS control policy data for a PCC rule. AllowedValues: N/A | type: String multiplicity: 1 isOrdered: N/A isUnique: N/A defaultValue: None isNullable: False |
| fiveQICharacteristics | It specifies the 5QI value and the cooresponding QoS characteristics for a 5QI. AllowedValues: N/A | type: FiveQICharacteristics multiplicity: 1 isOrdered: N/A isUnique: N/A defaultValue: None isNullable: False |
| maxbrUl | It represents the maximum uplink bandwidth formatted as follows: Pattern: '^\d+(\.\d+)? (bps|Kbps|Mbps|Gbps|Tbps)$', see TS 29.512. | type: String multiplicity: 1 isOrdered: N/A isUnique: N/A |

-continued

| Attribute Name | Documentation and Allowed Values | Properties |
|---|---|---|
| | Examples:<br>"125 Mbps", "0.125 Gbps", "125000 Kbps"<br>AllowedValues: N/A | defaultValue: None<br>isNullable: True |
| maxbrDl | It represents the maximum downlink bandwidth formatted as follows:<br>Pattern: '^\d+(\.\d+)?(bps\|Kbps\|Mbps\|Gbps\|Tbps)$', see TS 29.512.<br>Examples:<br>"125 Mbps", "0.125 Gbps", "125000 Kbps".<br>AllowedValues: N/A. | type: String<br>multiplicity: 1<br>isOrdered: N/A<br>isUnique: N/A<br>defaultValue: None<br>isNullable: True |
| gbrUl | It represents the guaranteed uplink bandwidth formatted as follows:<br>Pattern: '^\d+(\.\d+)?(bps\|Kbps\|Mbps\|Gbps\|Tbps)$', see TS 29.512.<br>Examples:<br>"125 Mbps", "0.125 Gbps", "12.5000 Kbps".<br>AllowedValues: N/A. | type: String<br>multiplicity: 1<br>isOrdered: N/A<br>isUnique: N/A<br>defaultValue: None<br>isNullable: True |
| gbrDl | It represents the guaranteed downlink bandwidth formatted as follows:<br>Pattern: '^\d+(\.\d+)?(bps\|Kbps\|Mbps\|Gbps\|Tbps)$', see TS 29.512.<br>Examples:<br>"125 Mbps", "0.125 Gbps", "125000 Kbps".<br>AllowedValues: N/A. | type: String<br>multiplicity: 1<br>isOrdered: N/A<br>isUnique: N/A<br>defaultValue: None<br>isNullable: True |
| arp | It indicates the allocation and retention priority.<br>AllowedValues: N/A. | type: ARP<br>multiplicity: 1<br>isOrdered: N/A<br>isUnique: N/A<br>defaultValue: None<br>isNullable: False |
| priorityLevel | It defines the relative importance of a resource request.<br>AllowedValues: 1 . . . 15. | type: Integer<br>multiplicity: 1<br>isOrdered: N/A<br>isUnique: N/A<br>defaultValue: None<br>isNullable: False |
| preemptCap | It defines whether a service data flow may get resources that were already assigned to another service data flow with a lower priority level.<br>AllowedValues: "NOT_PREEMPT", "MAY_PREEMPT". | type: ENUM<br>multiplicity: 1<br>isOrdered: N/A<br>isUnique: N/A<br>defaultValue: None<br>isNullable: False |
| preemptVuln | It defines whether a service data flow may lose the resources assigned to it in order to admit a service data flow with higher priority level.<br>AllowedValues: "NOT_PREEMPTABLE", "PREEMPTABLE". | type: ENUM<br>multiplicity: 1<br>isOrdered: N/A<br>isUnique: N/A<br>defaultValue: None<br>isNullable: False |
| qosNotificationControl | It indicates whether notifications are requested from 3GPP NG-RAN when the GFBR can no longer (or again) be guaranteed for a QoS Flow during the lifetime of the QoS Flow. The default value is "FALSE".<br>AllowedValues: "TRUE", "FALSE". | type: Boolean<br>multiplicity: 1<br>isOrdered: N/A<br>isUnique: N/A<br>defaultValue: "FALSE"<br>isNullable: False |
| reflectiveQos | Indicates whether the QoS information is reflective for the corresponding non-GBR service data flow. The default value is "FALSE".<br>AllowedValues: "TRUE", "FALSE". | type: Boolean<br>multiplicity: 1<br>isOrdered: N/A<br>isUnique: N/A<br>defaultValue: "FALSE"<br>IsNullable: False |
| sharingKeyDl | It indicates, by containing the same value, what PCC rules may share resource in downlink direction.<br>AllowedValues: N/A. | type: String<br>multiplicity: 1<br>isOrdered: N/A<br>isUnique: N/A<br>defaultValue: None<br>isNullable: True |
| sharingKeyUl | It indicates, by containing the same value, what PCC rules may share resource in uplink direction.<br>AllowedValues: N/A. | type: String<br>multiplicity: 1<br>isOrdered: N/A<br>isUnique: N/A<br>defaultValue: None<br>isNullable: True |

| Attribute Name | Documentation and Allowed Values | Properties |
| --- | --- | --- |
| maxPacketLossRateDl | It indicates the downlink maximum rate for lost packets that can be tolerated for the service data flow.<br>AllowedValues: 0 . . . 1000. | type: Integer<br>multiplicity: 1<br>isOrdered: N/A<br>isUnique: N/A<br>defaultValue: None<br>isNullable: True |
| maxPacketLossRateUl | It indicates the uplink maximum rate for lost packets that can be tolerated for the service data flow.<br>AllowedValues: 0 . . . 1000. | type: Integer<br>multiplicity: 1<br>isOrdered: N/A<br>isUnique: N/A<br>defaultValue: None<br>isNullable: True |
| tcId | It univocally identifies the traffic control policy data within a PDU session.<br>AllowedValues: N/A. | type: String<br>multiplicity: 1<br>isOrdered: N/A<br>isUnique: N/A<br>defaultValue: None<br>isNullable: False |
| flowStatus | It represents whether the service data flow(s) are enabled or disabled. The default value is "ENABLED". See TS 29.514.<br>AllowedValues: "ENABLED-UPLINK", "ENABLED-DOWNLINK", "ENABLED", "DISABLED", "REMOVED". | type: ENUM<br>multiplicity: 1<br>isOrdered: N/A<br>isUnique: N/A<br>defaultValue: "ENABLED"<br>isNullable: False |
| redirectInfo | It indicates whether the detected application traffic should be redirected to another controlled address.<br>AllowedValues: N/A. | type: RedirectInformation<br>multiplicity: 1 . . . *<br>isOrdered: N/A<br>isUnique: N/A<br>defaultValue: "ENABLED"<br>isNullable: False |
| redirectEnabled | It indicates whether the redirect instruction is enabled.<br>AllowedValues: "TRUE", "FALSE". | type: Boolean<br>multiplicity: 1<br>isOrdered: N/A<br>isUnique: N/A<br>defaultValue: None<br>isNullable: False |
| redirectAddressType | It indicates the type of redirect address, see TS 29.512.<br>AllowedValues: "IPV4_ADDR", "IPV6_ADDR", "URL", "SIP_URI". | type: ENUM<br>multiplicity: 1<br>isOrdered: N/A<br>isUnique: N/A<br>defaultValue: None<br>isNullable: False |
| redirectServerAddress | It indicates the address of the redirect server.<br>AllowedValues: N/A. | type: String<br>multiplicity: 1<br>isOrdered: N/A<br>isUnique: N/A<br>defaultValue: None<br>isNullable: False |
| muteNotif | It indicates whether applicat'on's start or stop notification is to be muted. The default value is "FALSE".<br>AllowedValues: "TRUE", "FALSE". | type: Boolean<br>multiplicity: 1<br>isOrdered: N/A<br>isUnique: N/A<br>defaultValue: "FALSE"<br>isNullable: False |
| trafficSteeringPolIdDl | It references to a pre-configured traffic steering policy for downlink traffic at the SMF, see TS 29.512.<br>AllowedValues: N/A. | type: String<br>multiplicity: 1<br>isOrdered: N/A<br>isUnique: N/A<br>defaultValue: None<br>isNullable: False |
| trafficSteeringPolIdUl | It references to a pre-configured traffic steering policy for uplink traffic at the SMF, see TS 29.512.<br>AllowedValues: N/A. | type: String<br>multiplicity: 1<br>isOrdered: N/A<br>isUnique: N/A<br>defaultValue: None<br>isNullable: False |
| routeToLocs | It provides a list of location which the traffic shall be routed to for the AF request.<br>AllowedValues: N/A. | type: RouteToLocation<br>multiplicity: 1 . . . *<br>isOrdered: N/A<br>isUnique: N/A |

-continued

| Attribute Name | Documentation and Allowed Values | Properties |
|---|---|---|
| dnai | It represents the DNAI (Data network access identifier), see 3GPP TS 23.501. AllowedValues: N/A. | defaultValue: None isNullable: False type: String multiplicity: 1 isOrdered: N/A isUnique: N/A defaultValue: None isNullable: False |
| routeInfo | It provides the traffic routing information. AllowedValues: N/A. | type: RouteInformation multiplicity: 1 isOrdered: N/A isUnique: N/A defaultValue: None isNullable: False |
| ipv4Addr | It defines the Ipv4 address of the tunnel end point in the data network, formatted in the "dotted decimal" notation. Pattens: '^(([0-9]\|[1-9][0-9]\|1[0-9][0-9]\|2[0-4][0-9]\|25[0-5])\\.){3}([0-9]\|[1-9][0-9]\|1[0-9][0-9]\|2[0-4][0-9]\|25[0-5])$'. AllowedValues: N/A. | type: String multiplicity: 1 isOrdered: N/A isUnique: N/A defaultValue: None isNullable: False |
| ipv6Addr | It defines the Ipv6 address of the tunnel end point in the data network. Pattern: '^((:\|(0?\|([1-9a-f][0-9a-f]{0,3}))):)((0?\|([1-9a-f][0-9a-f]{0,3})):){0,6}(:\|(0?\|([1-9a-f][0-9a-f]{0,3})))$' and Pattern: '^((([^:]+:){7}([^:]+))\|((([^:]+:)*[^:]+)?::(([^:]+:)*[^:]+)?))$'. AllowedValues: N/A. | type: String multiplicity: 1 isOrdered: N/A isUnique: N/A defaultValue: None isNullable: False |
| portNumber | It defines the UDP port number of the tunnel end point in the data network, see TS 29.571. AllowedValues: N/A. | type: Integer multiplicity: 1 isOrdered: N/A isUnique: N/A defaultValue: None isNullable: False |
| routeProfId | It identifies the routing profile. AllowedValues: N/A. | type: String multiplicity: 1 isOrdered: N/A isUnique: N/A defaultValue: None isNullable: False |
| upPathChgEvent | It contains the information about the AF subscriptions of the UP path change. AllowedValues: N/A. | type: UpPathChgEvent multiplicity: 1 isOrdered: N/A isUnique: N/A defaultValue: None isNullable: False |
| notificationUri | It provides notification address (Uri) of AF receiving the event notification. AllowedValues: N/A. | type: String multiplicity: 1 isOrdered: N/A isUnique: N/A defaultValue: None isNullable: False |
| notifCorreId | It is used to set the value of Notification Correlation ID in the notification sent by the SMF, see TS 29.512. AllowedValues: N/A. | type: String multiplicity: 1 isOrdered: N/A isUnique: N/A defaultValue: None isNullable: False |
| dnaiChgType | Indicates the type of DNAI change, see TS 29.512. AllowedValues: "EARLY", "EARLY_LATE", "LATE". | type: ENUM multiplicity: 1 isOrdered: N/A isUnique: N/A defaultValue: None isNullable: False |
| afAckInd | It identifies whether the AF acknowledgement of UP path event notification is expected. The default value is "FALSE". AllowedValues: "TRUE", "FALSE". | type: Boolean multiplicity: 1 isOrdered: N/A isUnique: N/A defaultValue: "FALSE" isNullable: False |

-continued

| Attribute Name | Documentation and Allowed Values | Properties |
| --- | --- | --- |
| steerFun | It indicates the applicable traffic steering functionality, see TS 29.512. AllowedValues: "MPTCP", "ATSSS_LL". | type: ENUM multiplicity: 1 isOrdered: N/A isUnique: N/A defaultValue: None isNullable: False |
| steerModeDl | It provides the traffic distribution rule across 3GPP and Non-3GPP accesses to apply for downlink traffic. AllowedValues: N/A. | type: SteeringMode multiplicity: 1 isOrdered: N/A isUnique: N/A defaultValue: None isNullable: False |
| steerModeUl | It provides the traffic distribution rule across 3GPP and Non-3GPP accesses to apply for uplink traffic. AllowedValues: N/A. | type: SteeringMode multiplicity: 1 isOrdered: N/A isUnique: N/A defaultValue: None isNullable: False |
| steerModeValue | It indicates the value of the steering mode, see TS 29.512. AllowedValues: "ACTIVE_STANDBY", "LOAD_BALANCING", "SMALLEST_DELAY", "PRIORITY_BASED". | type: ENUM multiplicity: 1 isOrdered: N/A isUnique: N/A defaultValue: None isNullable: False |
| active | It indicates the active access, see TS 29.571. AllowedValues: "3GPP_ACCESS", "NON_3GPP_ACCESS". | type: ENUM multiplicity: 1 isOrdered: N/A isUnique: N/A defaultValue: None isNullable: False |
| standby | It indicates the Standby access, see TS 29.571. AllowedValues: "3GPP_ACCESS", "NON_3GPP_ACCESS". | type: ENUM multiplicity: 1 isOrdered: N/A isUnique: N/A defaultValue: None isNullable: False |
| threeGLoad | It indicates the traffic load to steer to the 3GPP Access expressed its one percent. AllowedValues: 0 . . . 100. | type: Integer multiplicity: 1 isOrdered: N/A isUnique: N/A defaultValue: None isNullable: False |
| prioAcc | It indicates the high priority access, see TS 29.571. AllowedValues: "3GPP_ACCESS", "NON_3GPP_ACCESS". | type: ENUM multiplicity: 1 isOrdered: N/A isUnique: N/A defaultValue: None isNullable: False |
| condId | It uniquely identifies the condition data. AllowedValues: N/A. | type: String multiplicity: 1 isOrdered: N/A isUnique: N/A defaultValue: None isNullable: False |
| activationTime | It indicates the time (in date-time format) when the decision data shall be activated, see TS 29.512. AllowedValues: N/A. | type: String multiplicity: 1 isOrdered: N/A isUnique: N/A defaultValue: None isNullable: False |
| deactivationTime | It indicates the time (in date-time format) when the decision data shall be deactivated, see TS 29.512 and TS 29.571. AllowedValues: N/A. | type: String multiplicity: 1 isOrdered: N/A isUnique: N/A defaultValue: None isNullable: False |
| accessType | It provides the condition of access type of the UE when the session AMBR shall be enforced, see TS 29.512. AllowedValues: "3GPP_ACCESS", "NON_3GPP_ACCESS". | type: ENUM multiplicity: 1 isOrdered: N/A isUnique: N/A defaultValue: None isNullable: False |
| ratType | It provides the condition of RAT type of the UE when the session AMBR shall be enforced, see TS 29.512 and TS 29.571. AllowedValues: "NR", "EUTRA", "WLAN", | type: ENUM multiplicity: 1 isOrdered: N/A isUnique: N/A |

-continued

| Attribute Name | Documentation and Allowed Values | Properties |
|---|---|---|
| | "VIRTUAL", "NBIOT", "WIRELINE", "WIRELINE_CABLE", "WIRELINE_BBF", "LTE-M", "NR_U", "EUTRA_U", "TRUSTED_N3GA", "TRUSTED_WLAN", "UTRA", "GERA". | defaultValue: None isNullable: False |

To add association relation (by configurable5QISetRef attribute) between PCFFunction IOC and Configurable5QISet IO in TS 28.541 for enabling the PCF to support configurable 5QIs.

5.3.5 PCFFunction 5.3.5.1 Definition

This IOC represents the PCF function in the 5GC. For more information about the PCF, see 3GPP TS 23.501.

5.3.5.2 Attributes

The PCFFunction IOC includes attributes inherited from ManagedFunction IOC (defined in TS 28.622) and the following attributes:

| Attribute name | Support Qualifier | isReadable | isWritable | isInvariant | isNotifyable |
|---|---|---|---|---|---|
| pLMNIdList | M | T | T | F | T |
| sBIFQDN | M | T | T | F | T |
| sNSSAIList | CM | T | T | F | T |
| managedNFProfile | M | T | T | F | T |
| commModelList | M | T | T | F | T |
| supportedBMOList | O | T | T | F | T |
| Attribute related to role | | | | | |
| configurable5QISetRef | O | T | T | F | T |

5.3.5.3 Attribute constraints

| Name | Definition |
|---|---|
| sNSSAIList Support Qualifier | Condition: network slicing feature is supported. |

5.3.5.4 Notifications

The common notifications defined in subclause 5.5 are valid for this IOC, without exceptions or additions.

Figure 5:
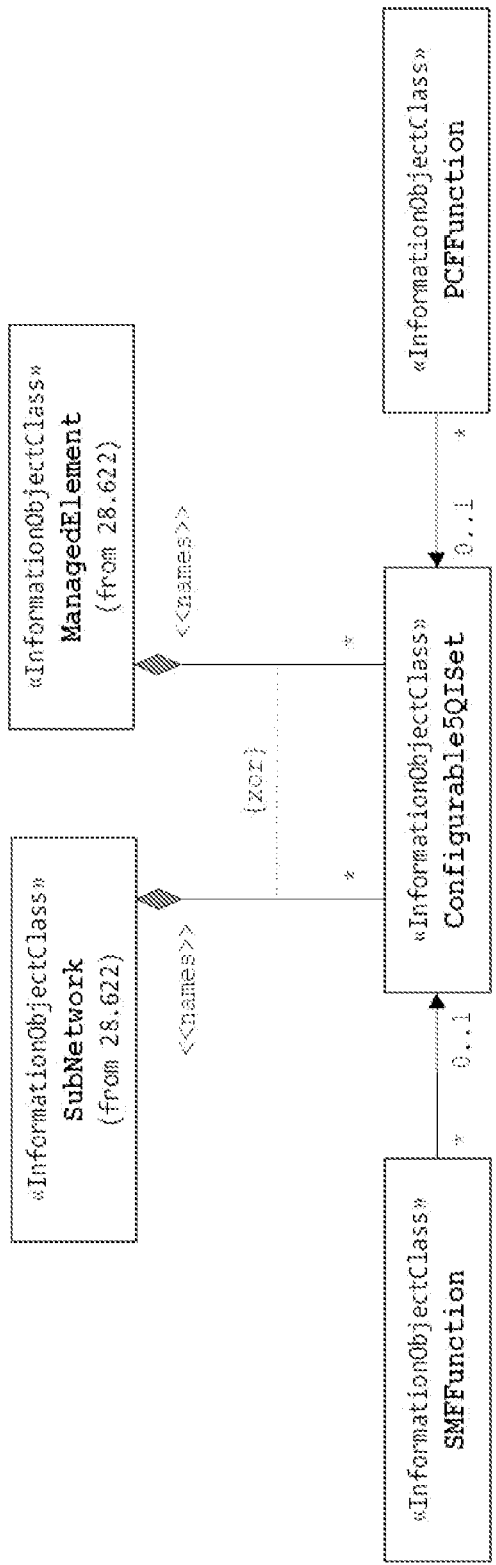

FIG. 5 illustrates a NRM fragment for configurable 5Qis in the 5GC in accordance with some embodiments.

3. To define the following IOC, dataTypes or attributes in TS 28.541 for dynamic 5QI monitoring.

4.3.2 GNBCUCPFunction 4.3.2.1 Definition

For non-split NG-RAN deployment scenario, this IOC together with GNBCUUPFunction IOC and GNBDUFunction IOC provide the management representation of gNB defined in clause 6.1.1 in 3GPP TS 38.401.

For 2-split NG-RAN deployment scenario, this IOC together with GNBCUUPFunction IOC provide management representation of the gNB-CU defined in clause 6.1.1 in 3GPP TS 38.401.

For 3-split NG-RAN deployment scenario, this IOC provides management representation of gNB-CU-CP defined in clause 6.1.2 in 3GPP TS 38.401.

The following table identifies the end points for the representation of gNB and en-gNB, of all deployment scenarios.

| Req Role | End point for 3-split deployment scenario | End point for 2-split deployment scenario | End point for Non-split deployment scenario |
|---|---|---|---|
| gNB | <<IOC>>EP_XnC, <<IOC>>EP_NgC, <<IOC>>EP_F1C, <<IOC>>EP_E1. | <<IOC>>EP_XnC, <<IOC>>EP_NgC, <<IOC>>EP_F1C, <<IOC>>EP_F1U. | <<IOC>>EP_XnC, <<IOC>>EP_NgC. |
| en-gNB | <<IOC>>EP_X2C, <<IOC>>EP_F1C, <<IOC>>EP_E1. | <<IOC>>EP_X2C, <<IOC>>EP_F1C. | <<IOC>>EP_X2C. |

4.3.2.2 Attributes

The GNBCUCPFunction IOC includes attributes inherited from ManagedFunction IOC (defined in TS 28.622) and the following attributes:

| Attribute name | Support Qualifier | isReadable | isWritable | isInvariant | isNotifyable |
|---|---|---|---|---|---|
| gNBId | M | T | T | F | T |
| gNBIdLength | M | T | T | F | T |
| gNBCUName | O | T | T | F | T |
| pLMNId | M | T | T | T | T |

-continued

| Attribute name | Support Qualifier | isReadable | isWritable | isInvariant | isNotifyable |
|---|---|---|---|---|---|
| x2BlackList | CM | T | T | F | T |
| x2WhiteList | CM | T | T | F | T |
| xnBlackList | M | T | T | F | T |
| xnWhiteList | M | T | T | F | T |
| x2XnHOBlackList | CM | T | T | F | T |
| mappingSetIDBackhaulAddressList | CM | T | T | F | T |
| Attribute related to role | | | | | |
| configurable5QISetRef | O | T | T | F | T |
| dynamic5QISetRef | O | T | F | F | T |

4.3.2.3 Attribute constraints

| Name | Definition |
|---|---|
| x2BlackList | Condition: Multi-Radio Dual Connectivity with the EPC (see TS 37.340 clause 4.1.2) is supported. |
| x2WhiteList | Condition: Multi-Radio Dual Connectivity with the EPC (see TS 37.340 clause 4.1.2) is supported. |
| mappingSetIDBackhaulAddressList | Condition: Remote Interference Management function is supported. |

4.3.2.4 Notifications

The common notifications defined in subclause 4.5 are valid for this IOC, without exceptions or additions.

4.3.3 GNBCUUPFunction

4.3.3.1 Definition

For non-split NG-RAN deployment scenario, this IOC together with GNBCUCPFunction IOC and GNBDUFunction IOC provide the management representation of gNB defined in clause 6.1.1 in 3GPP TS 38.401.

For 2-split NG-RAN deployment scenario, this IOC together with GNBCUCPFunction IOC provide management representation of gNB-CU defined in clause 6.1.1 in 3GPP TS 38.401.

For 3-split NG-RAN deployment scenario, this IOC provides management representation of gNB-CU-UP defined in clause 6.1.2 in 3GPP TS 38.401.

The following table identifies the end points for the representation of gNB and en-gNB, of all deployment scenarios.

| Req Role | End point for 3-split deployment scenario | End point for 2-split deployment scenario | End point for Non-split deployment scenario |
|---|---|---|---|
| gNB | <<IOC>>EP_XnU, <<IOC>>EP_NgU, <<IOC>>EP_F1U, <<IOC>>EP_E1. | <<IOC>>EP_XnU, <<IOC>>EP_NgU, <<IOC>>EP_F1U. | <<IOC>>EP_XnU, <<IOC>>EP_NgU. |
| en-gNB | <<IOC>>EP_X2U, <<IOC>>EP_S1U, <<IOC>>EP_F1U, <<IOC>>EP_E1. | <<IOC>>EP_X2U, <<IOC>>EP_S1U, <<IOC>>EP_F1U. | <<IOC>>EP_X2U, <<IOC>>EP_S1U. |

4.3.3.2 Attributes

The GNBCUUPFunction IOC includes attributes inherited from ManagedFunction IOC (defined in TS 28.622) and the following attributes:

| Attribute name | Support Qualifier | isReadable | isWritable | isInvariant | isNotifyable |
|---|---|---|---|---|---|
| gNBCUUPId | M | T | F | T | T |
| pLMNInfoList | M | T | T | F | T |
| gNBId | M | T | T | F | T |
| gNBIdLength | M | T | T | F | T |
| Attribute related to role | | | | | |
| configurable5QISetRef | O | T | T | F | T |
| dynamic5QISetRef | O | T | F | F | T |

4.3.3.3 Attribute constraints
None.
4.3.3.4 Notifications
The common notifications defined in subclause 4.5 are valid for this IOC, without exceptions or additions.

Figure 6:
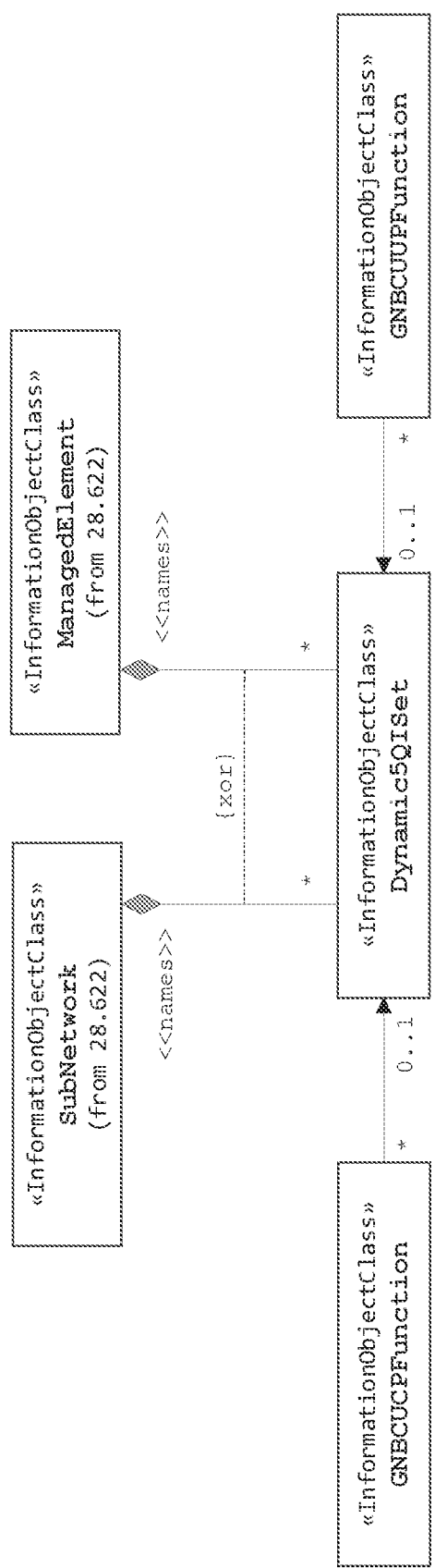

FIG. 6 illustrates a NRM fragment for dynamic 5QIs in a NG-RAN in accordance with some embodiments.

5.3.2 SMFFunction
5.3.2.1 Definition
This IOC represents the SMF function in the 5GC. For more information about the SMF, see 3GPP TS 23.501.

5.3.2.2 Attributes
The SMFFunction IOC includes attributes inherited from ManagedFunction IOC (defined in TS 28.622) and the following attributes:

| Attribute name | Support Qualifier | isReadable | isWritable | isInvariant | isNotifyable |
|---|---|---|---|---|---|
| pLMNIdList | M | T | T | F | T |
| nRTAClist | M | T | T | F | T |
| sBIFQDN | M | T | T | F | T |
| sNSSAIList | CM | T | T | F | T |
| managedNFProfile | M | T | T | F | T |
| commModelList | M | T | T | F | T |
| Attribute related to role | | | | | |
| configurable5QISetRef | O | T | T | F | T |
| dynamic5QISetRef | O | T | F | F | T |

5.3.2.3 Attribute constraints

| Name | Definition |
|---|---|
| sNSSAIList Support Qualifier | Condition: Network slicing feature is supported. |

5.3.2.4 Notifications
The common notifications defined in subclause 5.5 are valid for this IOC, without exceptions or additions.

5.3.5 PCFFunction
5.3.5.1 Definition
This IOC represents the PCF function in the 5GC. For more information about the PCF, see 3GPP TS 23.501.

5.3.5.2 Attributes
The PCFFunction IOC includes attributes inherited from ManagedFunction IOC (defined in TS 28.622) and the following attributes:

| Attribute name | Support Qualifier | isReadable | isWritable | isInvariant | isNotifyable |
|---|---|---|---|---|---|
| pLMNIdList | M | T | T | F | T |
| sBIFQDN | M | T | T | F | T |
| sNSSAIList | CM | T | T | F | T |
| managedNFProfile | M | T | T | F | T |
| commModelList | M | T | T | F | T |
| supportedBMOList | O | T | T | F | T |
| Attribute related to role | | | | | |
| dynamic5QISetRef | O | T | F | F | T |

5.3.5.3 Attribute constraints

| Name | Definition |
|---|---|
| sNSSAIList Support Qualifier | Condition: network slicing feature is supported. |

5.3.5.4 Notifications
The common notifications defined in subclause 5.5 are valid for this IOC, without exceptions or additions.

5.3.x Dynamic5QISet
5.3.x.1 Definition
This IOC specifies the dynamic 5QIs including their QoS characteristics, see 3GPP TS 23.501. The instance of this IOC shall not be created or modified by the MnS consumer.

5.3.x.2 Attributes

| Attribute name | Support Qualifier | isReadable | isWritable | isInvariant | isNotifyable |
|---|---|---|---|---|---|
| dynamic5QIs | M | T | F | F | T |

5.3.x.3 Attribute constraints
None.
5.3.x.4 Notifications
The common notifications defined in subclause 5.5 are valid for this IOC, without exceptions or additions.

Figure 7:
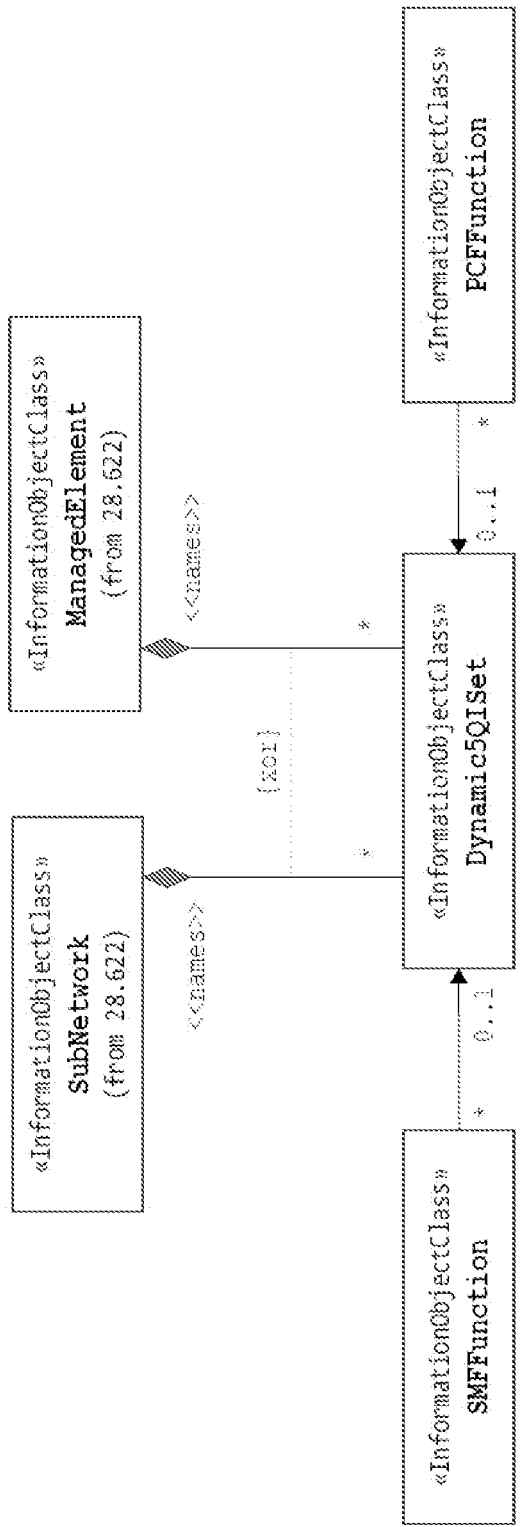

FIG. 7 illustrates a NRM fragment for dynamic 5Qis in the 5GC in accordance with some embodiments.

Figure 8:
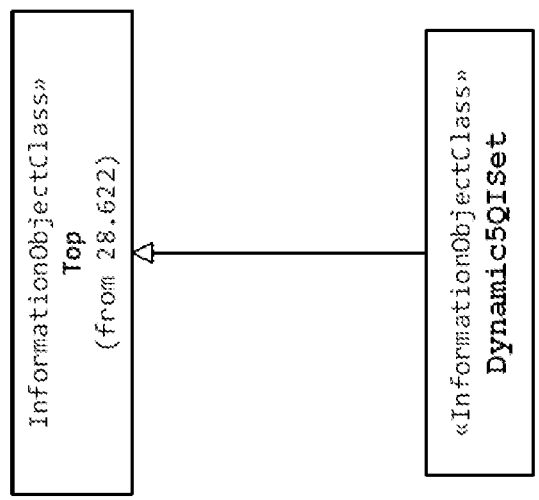

FIG. 8 illustrates an inheritance hierarchy for IOC Dynamic5QISet in accordance with some embodiments.

5.x.y Attribute properties
The following table defines the attributes that are present in several Information Object Classes (IOCs) and data types of the present document.

| Attribute Name | Documentation and Allowed Values | Properties |
|---|---|---|
| dynamic5QISetRef | This is the DN of Dynamic5QISet. allowedValues: DN of the Dynamic5QISet MOI. | type: String multiplicity: 0 . . . 1 isOrdered: False isUnique: True defaultValue: None isNullable: True |
| dynamic5QIs | It indicates the dynamic 5QIs, including their QoS characteristics. allowedValues: N/A | type: FiveQICharacteristics multiplicity: * isOrdered: N/A isUnique: N/A defaultValue: None isNullable: False |

Figure 9:
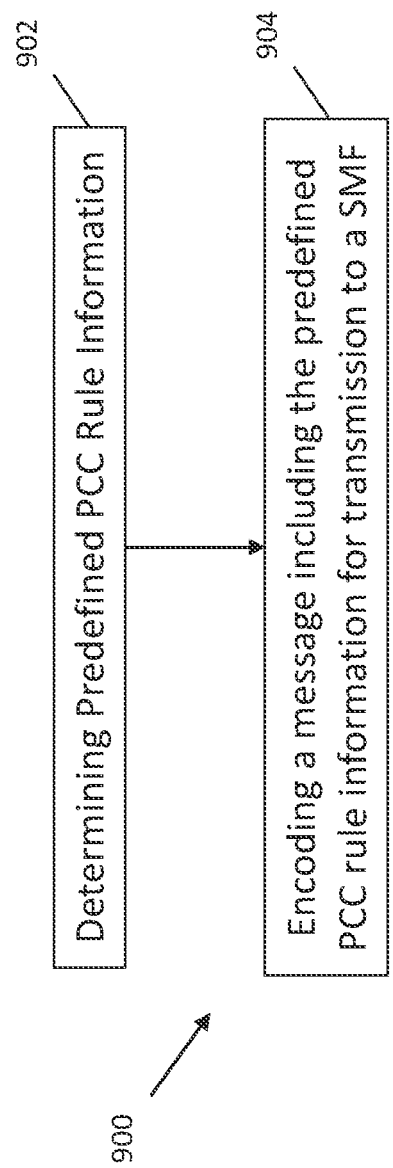

FIG. 9 illustrates a method of providing PCC rule information in accordance with some embodiments. The operations shown in FIG. 7 are not exclusive; other operations not shown in FIG. 7 may also be present. The process 900 may include, at operation 902, determining predefined PCC rule information. The process 900 may further include, at operation 904, encoding a message including the predefined PCC rule information for transmission to a SMF.

A predefined PCC rule is configured in the SMF. When a predefined PCC rule is activated/deactivated by the PCF, the SMF decides what information is to be provided to the UPF to enforce the rule based on where the traffic detection filters (i.e. service data flow filter(s) or application detection filter), traffic steering policy information and the policies used for the traffic handling in the UPF are configured and where they are enforced: If the predefined PCC rule contains an application identifier for which corresponding application detection filters are configured in the UPF, the SMF provides a corresponding application identifier to the UPF; If the predefined PCC rule contains traffic steering policy identifier(s), the SMF provides a corresponding traffic steering policy identifier(s) to the UPF; If the predefined PCC rule contains service data flow filter(s), the SMF provides them to the UPF; If the predefined PCC rule contains some parameters for which corresponding policies for traffic handling in the UPF are configured in the UPF, the SMF activates those traffic handling policies via their rule ID(s). The SMF maintains the mapping between a PCC rule received over Npcf and the flow level PDR rule(s) used on N4 interface.

An active PCC rule means that: the service data flow template is used for service data flow detection; the service data flow template shall be used for mapping of downlink packets to the QoS Flow determined by the QoS Flow binding; the service data flow template shall be used for service data flow detection of uplink packets on the PDU Session determined by the QoS Flow binding; usage data for the service data flow shall be recorded; policies associated with the PCC rule, if any, shall be invoked; for service data flow detection with an application detection filter, the start or the stop of the application traffic is reported to the PCF, if applicable and requested by the PCF. In that case, the notification for start may include service data flow filters, (if possible to provide) and the application instance identifier associated with the service data flow filters; and either one of the conditions: a credit has been granted for the service data flow. Applicable when the Charging method is set to "online" and the Service Data Flow handling while requesting credit is set to "blocking"; or a credit has been requested for the service data flow. Applicable when the Charging method is set to "online" and the Service Data Flow handling while requesting credit is set to "non-blocking".

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to operate as a Policy Control Function (PCF), the apparatus comprising:
  processing circuitry configured to, when instructions are executed:
    represent the PCF in a $5^{th}$ generation (5G) core network (5GC) as a PCFFunction Information Object Class (IOC) that includes a configurable5QISetRef attribute and a dynamic5QISetRef attribute, the configurable5QISetRef attribute providing a domain name (DN) of preconfigured 5G Quality of Service (QoS) Identifiers (5QIs) and QoS characteristics of the preconfigured 5QIs, the dynamic5QISetRef attribute providing a DN of dynamic 5QIs including QoS characteristics of the dynamic 5QIs, and
    configure a session management function (SMF) with predefined policy and charging control (PCC) rules specified by a PredefinedPccRules attribute in a PredefinedPccRuleSet attribute; and
  a memory configured to store the instructions.

2. The apparatus of claim 1, wherein each predefined PCC rule has a PCCRule data type that specifies the predefined PCC rule and includes:
  a PCCRuleID attribute that uniquely identifies the predefined PCC rule,
  a qosData attribute that contains QoS control policy data for the predefined PCC rule, and
  a trafficControlData attribute that contains traffic policy data for the predefined PCC rule.

3. The apparatus of claim 2, wherein the PCCRule data type further includes:
  a flowInfoList attribute that is a list of internet protocol (IP) flow packet filter information,
  an applicationID attribute that refers to an application detection filter configured at a user plane function (UPF), and
  a precedence attribute that indicates an order in which the predefined PCC rule is applied relative to other PCC rules within a packet data unit (PDU) session.

4. The apparatus of claim 2, wherein the PCCRule data type further includes:
  a contentVersion attribute that indicates a content version of the predefined PCC rule,
  an afSigProtocol attribute that indicates a protocol used for signaling between a user equipment (UE) and an application function (AF),
  an isAppRelocatable attribute that indicates a possibility of application relocation,
  an isUeAddrPreserved attribute an indication of whether a UE IP address should be preserved, and
  a conditionData attribute that indicates condition data for the predefined PCC rule.

5. The apparatus of claim 4, wherein each predefined PCC rule has a ConditionData data type that specifies the condition data for the predefined PCC rule and that includes:
  a condId attribute that identifies the condition data,
  activationTime and deactivationTime attributes that respectively indicates a time when decision data is to be activated and deactivated,
  an accessType attribute that provides a condition of an access type of the UE when a session Aggregate Maximum Bit Rate (AMBR) is to be enforced, and
  a ratType attribute that provides a condition of a radio access technology (RAT) type of the UE when the session AMBR is to be enforced.

6. The apparatus of claim 1, wherein each predefined PCC rule has a FlowInformation data type that specifies flow information of the predefined PCC rule and includes:
  a flowDescription attribute that defines a packet filter for an internet protocol (IP) flow,
  an ethFlowDescription attribute that defines a packet filter for an Ethernet flow,
  a packFiltId attribute is an identifier of a particular packet filter,
  a packetFilterUsage attribute indicates whether a packet is to be sent to a user equipment (UE),
  a tosTrafficClass attribute contains an Ipv4 Type-of-Service and mask field or a Ipv6 Traffic-Class field and mask field,
  a spi attribute is a security parameter index of an IPSec packet, and
  a flowDirection attribute indicates at least one direction that a filter is applicable.

7. The apparatus of claim 1, wherein each predefined PCC rule has an EthFlowDescription data type that describes an Ethernet flow and includes:
  a destMacAddr attribute that specifies a destination media access control (MAC) address,
  an ethType attribute that represents an Ethertype of the Ethernet flow,
  a fDesc attribute that contains a flow description for uplink or downlink internet protocol (IP) flow when the Ethertype is IP,
  a fDir attribute that indicates a packet filter direction,
  a sourceMacAddr attribute that specifies a source MAC address end,
  a vlanTags attribute that specifies at least one of Customer-virtual local access network (VLAN) and Service-VLAN tags containing vendor identifier (VID), Priority Code Point/Drop Eligible Indicator (PCP/DEI) fields, and
  a destMacAddrEnd attribute that specifies a destination MAC address end.

8. The apparatus of claim 1, wherein each predefined PCC rule has an QoSData data type that specifies QoS control policy data for a service data flow of the predefined PCC rule and that includes:
- a gosId attribute that contains the QoS control policy data for the predefined PCC rule,
- a fiveQI attribute that specifies at least a 5QI value,
- maxbrUl, maxbrDl, gbrUl, and gbrDl attributes that respectfully specify a maximum uplink bandwidth, maximum downlink bandwidth, guaranteed uplink bandwidth and guaranteed downlink bandwidth,
- an arp attribute that indicates allocation and retention priority,
- a gosNotificationControl attribute that indicates whether notifications are requested from a next generation radio access network (NG-RAN) when the uplink or downlink guaranteed bandwidth can no longer be guaranteed for a QoS Flow,
- a reflectiveQos attribute that indicates whether QoS information is reflective for a corresponding non-guaranteed bandwidth service data flow,
- sharingKeyUl and sharingKeyDl attributes that respectively indicates what PCC rules share resource in an uplink and downlink direction, and
- maxPacketLossRateDl and maxPacketLossRateUl attributes that respectively specifies an uplink and downlink maximum rate for lost packets that can be tolerated for the service data flow.

9. The apparatus of claim 8, wherein an arp data type of the arp attribute includes:
- a priorityLevel attribute that defines a relative importance of a resource request,
- a preemptCap attribute that defines whether a first service data flow is to get resources that were already assigned to a second service data flow with a lower priority level than the first service data flow, and
- a preemptVuln attribute that defines whether the first service data flow is to lose resources assigned to the first service data flow in order to admit a third service data flow with higher priority level than the first service data flow.

10. The apparatus of claim 1, wherein each predefined PCC rule has a TrafficControlData data type that specifies traffic control data for a service data flow of the predefined PCC rule and that includes:
- a tcID attribute that identifies traffic control policy data within a packet data unit (PDU) session,
- a flowStatus attribute that represents whether the service data flow is enabled or disabled,
- a routeToLocs attribute provides a list of locations where traffic is to be routed to for an application function (AF) request,
- a redirectInfo attribute indicates whether detected application traffic should be redirected to another controlled address,
- a muteNotif attribute indicates whether a start or stop notification of an application is to be muted,
- trafficSteeringPolIdUl and trafficSteeringPolIdDl attributes that respectively references a pre-configured traffic steering policy for uplink and downlink traffic at the SMF,
- an upPathChgEvent attribute contains information about AF subscriptions of a user plane (UP) path change,
- a steerFun attribute indicates applicable traffic steering functionality, and
- steerModeUl and steerModeDl attributes that respectively provides traffic distribution rules across 3GPP and Non-3GPP accesses to apply for uplink and downlink traffic.

11. The apparatus of claim 10, wherein each predefined PCC rule has a RedirectInformation data type that specifies redirect information for traffic control of the predefined PCC rule and that includes:
- a redirectEnabled attribute that indicates whether a redirect instruction is enabled,
- a redirectAddressType attribute that indicates a type of a redirect address, and
- a redirectServerAddress attribute that indicates an address of a redirect server.

12. The apparatus of claim 10, wherein each predefined PCC rule has a RouteToLocation data type that specifies the list of locations where traffic is to be routed to for the AF request and that includes:
- a data network access identifier (DNAI) attribute that represents a DNAI,
- a routeInfo attribute that provides traffic routing information, and
- a routeProfId attribute that identifies a routing profile.

13. The apparatus of claim 12, wherein each predefined PCC rule has a RouteInformation data type that specifies the traffic routing information and that includes:
- at least one of an ipv4Addr or ipv6Addr attribute that respectively defines an Ipv4 address or Ipv6 address of a tunnel end point in a data network, and
- a portNumber attribute that defines a user data plane (UDP) port number of the tunnel end point in the data network.

14. The apparatus of claim 10, wherein each predefined PCC rule has an UpPathChgEvent data type that specifies the information about the AF subscriptions of the UP path change and that includes:
- a notificationUri attribute that provides a notification address (URI) of an AF receiving an event notification,
- a notifCorreId attribute that is used to set a value of a Notification Correlation ID in a notification sent by the SMF,
- a dnaiChgType attribute that indicates a type of DNAI change, and
- an afAckInd attribute that identifies whether an AF acknowledgement of an UP path event notification is expected.

15. The apparatus of claim 10, wherein each predefined PCC rule has a SteeringMode data type that specifies each traffic distribution rule and that includes:
- a steerModeValue attribute that indicates a value of a steering mode,
- an active attribute that indicates active access,
- a standby attribute that indicates standby access,
- a threeGLoad attribute that indicates traffic load to steer to 3GPP Access, and
- a prioAcc attribute that indicates high priority access.

16. A non-transitory computer-readable storage medium that stores instructions for execution by one or more processors configured to operate as a Policy Control Function (PCF), the one or more processors to configure the PCF to, when the instructions are executed:
- represent the PCF in a $5^{th}$ generation (5G) core network (5GC) as a PCFFunction Information Object Class (IOC) that includes a configurable5QISetRef attribute and a dynamic5QISetRef attribute, the configurable5QISetRef attribute providing a domain name (DN) of preconfigured 5G Quality of Service (QoS) Identifiers (5QIs) and QoS characteristics of the preconfigured 5QIs, the dynamic5QISetRef attribute providing a DN of dynamic 5QIs including QoS characteristics of the dynamic 5QIs; and configure a session management function (SMF) with predefined policy and charging control (PCC) rules specified by a PredefinedPccRules attribute in a PredefinedPccRuleSet attribute.

17. The medium of claim 16, wherein each predefined PCC rule has a PCCRule data type that specifies the predefined PCC rule and includes:

a PCCRuleID attribute that uniquely identifies the predefined PCC rule, a gosData attribute that contains QoS control policy data for the predefined PCC rule, a trafficControlData attribute that contains traffic policy data for the predefined PCC rule, a flowInfoList attribute that is a list of internet protocol (IP) flow packet filter information, an applicationID attribute that refers to an application detection filter configured at a user plane function (UPF), a precedence attribute that indicates an order in which the predefined PCC rule is applied relative to other PCC rules within a packet data unit (PDU) session, an afSigProtocol attribute that indicates a protocol used for signaling between a user equipment (UE) and an application function (AF), an isAppRelocatable attribute that indicates a possibility of application relocation, an isUeAddrPreserved attribute an indication of whether a UE IP address should be preserved, and a conditionData attribute that indicates condition data for the predefined PCC rule.

18. The medium of claim 16, wherein each predefined PCC rule has an QoSData data type that specifies QoS control policy data for a service data flow of the predefined PCC rule and that includes:

a gosId attribute that contains the QoS control policy data for the predefined PCC rule, a fiveQI attribute that specifies at least a 5QI value, maxbrUl, maxbrDl, gbrUl, and gbrDl attributes that respectfully specify a maximum uplink bandwidth, maximum downlink bandwidth, guaranteed uplink bandwidth and guaranteed downlink bandwidth, an arp attribute that indicates allocation and retention priority, a gosNotificationControl attribute that indicates whether notifications are requested from a next generation radio access network (NG-RAN) when the uplink or downlink guaranteed bandwidth can no longer be guaranteed for a QoS Flow, a reflectiveQos attribute that indicates whether QoS information is reflective for a corresponding non-guaranteed bandwidth service data flow, sharingKeyUl and sharingKeyDl attributes that respectively indicates what PCC rules share resource in an uplink and downlink direction, and maxPacketLossRateDl and maxPacketLossRateUl attributes that respectively specifies an uplink and downlink maximum rate for lost packets that can be tolerated for the service data flow.

19. An apparatus configured to operate as a $5^{th}$ generation NodeB (gNB) central unit (gNB-CU), the apparatus comprising:

processing circuitry configured to, when instructions are executed:

represent the gNB-CU as a gNB-CU control plane (gNB-CU-CP) function (GNBCUCPFunction) Information Object Class (IOC) and a gNB-CU user plane (gNB-CU-UP) function (GNBCUUPFunction) IOC that each include a configurable5QISetRef attribute and a dynamic5QISetRef attribute, the configurable5QISetRef attribute providing a domain name (DN) of preconfigured 5G Quality of Service (QoS) Identifiers (5QIs) and QoS characteristics of the preconfigured 5QIs, the dynamic5QISetRef attribute providing a DN of dynamic 5QIs including QoS characteristics of the dynamic 5QIs, and manage the dynamic 5QIs using a dynamic5QISet IOC that specifies the dynamic 5QIs and QoS characteristics; and a memory configured to store the instructions.

20. The apparatus of claim 19, wherein the GNBC-UUPFunction includes:

a gNBCUUPId attribute that uniquely identifies the gNB-CU-UP at least within the gNB-CU-CP, a pLMNInfoList attribute that defines a public land mobile network (PLMN) of a Network Function, a gNBId attribute that identifies a particular gNB within a particular PLMN, and a gNBIdLength attribute that indicates a number of bits for encoding a gNB ID.

* * * * *